US007507577B2

(12) United States Patent
Tung

(10) Patent No.: US 7,507,577 B2
(45) Date of Patent: Mar. 24, 2009

(54) TREATMENT APPARATUS FOR EXCREMENT AND A BIO-TOILET USING THE SAME AND A TREATMENT METHOD FOR DECOMPOSING EXCREMENT

(76) Inventor: Andy Ming Fen Tung, 6 Pebblepath, Irvine, CA (US) 92614

( * ) Notice: Subject to any disclaimer, the term of this patent is extended or adjusted under 35 U.S.C. 154(b) by 704 days.

(21) Appl. No.: 10/756,740

(22) Filed: Jan. 13, 2004

(65) Prior Publication Data

US 2004/0194199 A1 Oct. 7, 2004

(30) Foreign Application Priority Data

Jan. 13, 2003 (CN) ............................... 03 1 00999
Jan. 13, 2003 (CN) ............................... 03 1 01000

(51) Int. Cl.
*C12M 1/02* (2006.01)
*C12M 1/10* (2006.01)
*C12M 3/00* (2006.01)
*E03D 9/10* (2006.01)

(52) U.S. Cl. .................... 435/290.2; 4/319; 4/320; 71/11; 71/12; 71/13; 71/14; 71/15; 435/289.1; 435/290.1; 435/291.5; 435/298.1

(58) Field of Classification Search .................. 4/319, 4/320; 71/11, 12, 13, 14, 15; 435/289.1, 435/290.1, 290.2, 291.5, 298.1
See application file for complete search history.

(56) References Cited

U.S. PATENT DOCUMENTS 4,521,304 A * 6/1985 Yount ..................... 210/96.1

(Continued)

FOREIGN PATENT DOCUMENTS

EP 0599661 A1 * 6/1994

(Continued)

OTHER PUBLICATIONS

English translation of JP 2001-120460, Kitsui, Toshihiro, May 8, 2001.*

(Continued)

*Primary Examiner*—William H Beisner
*Assistant Examiner*—Nathan A Bowers
(74) *Attorney, Agent, or Firm*—Greer, Burns & Crain, Ltd.

(57) ABSTRACT

The invention discloses a treatment apparatus for the excrement and a bio-toilet using the treatment apparatus. The treatment apparatus includes a tank, a reactor basin in the tank for containing the raw material and the excrement and having at least two parallel, concave parts having curved profile in the bottom part of the tank, a temperature control means for maintaining the temperature of the basin at a predetermined range; and at least two mixing devices which match with the at least two concave parts, each of them can rotate around a rotation shaft, the helical blade stirrer secured to the rotation shaft by a plurality of spokes. The bio-toilet is waterless, and thus a large quantity of water can be saved and the pollution of the environment due to the drainage of sewage can be avoided. Furthermore, treated by the treatment apparatus of the present invention, the microorganisms and the organic materials are combined and converted into stable loosen soil and the organic components. The load applied to the environment will be decreased and the environmental protection will be most effective by using the bio-toilet of the present invention.

19 Claims, 14 Drawing Sheets

U.S. PATENT DOCUMENTS

| | | | |
|---|---|---|---|
| 5,418,982 A * | 5/1995 | Kishi | 4/111.1 |
| 5,587,320 A * | 12/1996 | Shindo et al. | 435/290.1 |
| 6,024,513 A * | 2/2000 | Hudgins et al. | 405/129.95 |
| 2003/0153071 A1* | 8/2003 | Sattler et al. | 435/289.1 |

FOREIGN PATENT DOCUMENTS

| | | | |
|---|---|---|---|
| JP | 11300324 A | 11/1999 | |
| JP | 2001120460 A | 5/2001 | |

OTHER PUBLICATIONS

English translation of JP 11-300324, Kitsui, Toshihiro, Nov. 2, 1999.*

* cited by examiner

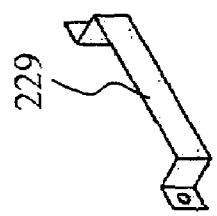
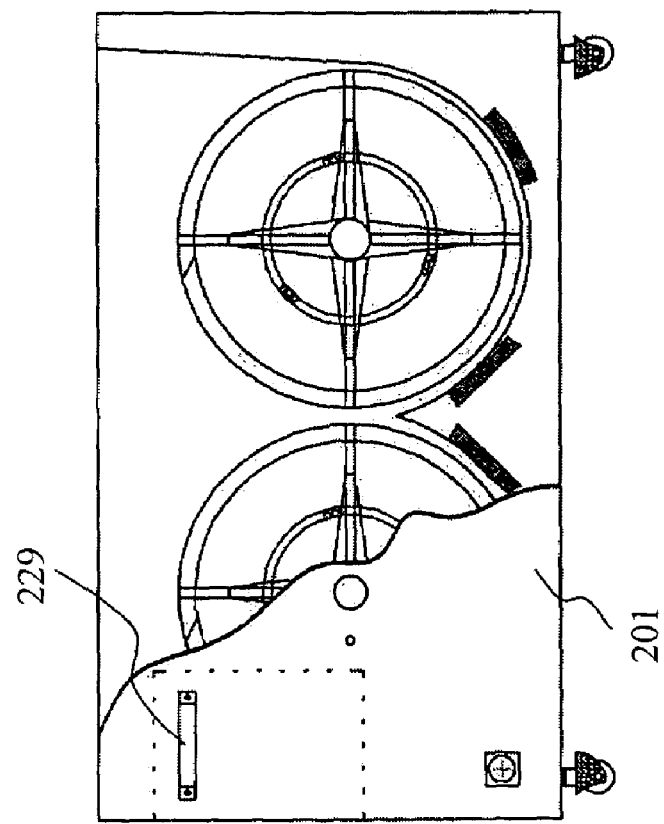
Fig.17B
Fig.17A

TREATMENT APPARATUS FOR EXCREMENT AND A BIO-TOILET USING THE SAME AND A TREATMENT METHOD FOR DECOMPOSING EXCREMENT

FIELD OF THE INVENTION

The invention relates to a bio-toilet, particularly to a treatment apparatus which can decompose and convert excrement into organic fertilizer.

BACKGROUND OF THE INVENTION

As a kind of conventional toilet, flushing toilet has been broadly used in cities. Using this kind of toilet, some kind of transport scheme has to be used firstly, then the excrement can be treated by an urban sewage treatment system. However, the treatment capacity of the urban sewage treatment system is limited and the conventional treatment method not only uses up large quantity of water, but also pollutes the environment due to its improper and non-recycling treatment of excrement. Hence, as people increasingly realized the importance of environmental protection, a variety of bio-toilets were developed. For example, in a bio-toilet disclosed by JP3160859, as shown in FIGS. 1A-1B, human waste—excrement and urine fall down directly into a treatment apparatus 10 of the conventional bio-toilet. The treatment apparatus 10 includes a reactor basin 12, a rotation shaft 14 driven by a motor 16 extending through the whole length of the basin 12 and a plurality of blades 18 secured to the rotation shaft 14. On one hand, these blades 18 stir the sawdust and human waste as the rotation shaft rotates, and on the other hand, blades 18 can also convey the treated excrement to the location away from the drop inlet. By adjusting the heating means 20, the temperature of the reactor basin 12 is maintained constant so as to refrain the microorganism in human waste from growing. In this way, after sawdust and human waste are mixed for a predetermined time period, the organic materials in the excrement are decomposed sufficiently and converted into organic fertilizer. However, in fact, in this treatment apparatus 10, the treatment efficiency is too low to be satisfactory in composting due to the limited capacity for treatment of the individual rotating shaft and insufficiently mixing of the prior art between the sawdust and human waste. In addition, the treatment apparatus of the prior art could not avoid the hardened trouble which is caused by the mixture of the sawdust and excrement and thus will be easily broken due to the increase of the torque load. Therefore, the bio-toilet of prior art could not be widely applied to the public sites, such as tourist sites, hospitals, temporary performance sites, construction sites, livestock farms, or parks etc., as the bio-toilet might be used frequently.

In general, in this bio-toilet of prior art, it takes a few days for the human waste to be converted into organic fertilizer. The human waste and sawdust in the reactor basin 12 is of being conveyed by the blades 18, however, it is hard time to face the trouble caused by the hardened mixture. Also, as shown in FIG. 1C, the urinary inlet and drop inlet must be spaced apart by a predetermined distance and the urinary inlet is often provided at one side of reactor basin, causing the uniformity of the mixture of the human waste and sawdust decreased. This is why the bio-toilet of prior art can only has a single mixing devise and can not increase the treatment capacity and efficiency by using more mixing devise with larger diameter.

As shown in the figures, although the profile of the bottom of the conventional reactor basin matches with that of blades 18, the harden problem can not fully eliminated. Furthermore, under present conditions, only by increasing the height of the reactor basin can the capacity of the reactor basin 12 be increased. Thus, it is difficult to entry into the bio-toilet and feed the sawdust. Due to the forgoing disadvantages, the maintenance for the conventional bio-toilet is troublesome and its use is dramatically limited.

SUMMARY OF THE INVENTION

An object of the invention is to provide a treatment apparatus for use in a bio-toilet, which comprises a tank, the top plate of which having at least one drop inlet; a reactor basin in the tank for containing the raw material and excrement, provided with concave parts having curved profile on the bottom of the basin; a temperature control means provided on an outer surface of the reactor basin for maintaining the temperature within the reactor basin at a predetermined range; and at least two mixing devices, spaced apart each other, each of which respectively has a rotation shaft and a helical blade stirrer provided on the rotation shaft by a plurality of spokes and is matched with each concave parts.

Another object of the invention is to provide a bio-toilet with high treatment capacity, which comprises a house being divided into two spaces by a floor. The space under the floor is provided with a tank, the top plate of which having at least one drop inlet; a reactor basin in the tank for containing the raw material and excrement, provided with concave parts having curved profile on the bottom; a temperature control means for maintaining the temperature within the reactor basin at a predetermined range; and at least two mixing devices for mixing the raw materials and excrement. The mixing devices are spaced apart each other, each of which respectively has a rotation shaft and a helical blade stirrer provided on the rotation shaft by a plurality of spokes and is matched with each concave parts. A driving means and a control unit are provided outside the tank for driving two mixing devices. The present invention can improve its performance and shorten dramatically the human waste treatment period by guiding the urine to the location where the sawdust located using a conduit.

A main object of the invention is to provide a treatment method for decomposing organic human waste, comprising the steps of providing a reactor basin for filling raw materials; providing a temperature control means for maintaining the temperature within the basin at a at a predetermined range; disposing two mixing devices in reactor basin for mixing the raw material and excrement; disposing a timer for detecting a time interval during which the mixing devices are in still state; and when the time interval is equal to a predetermined value, driving the mixing devices to stir the raw material. Therefore, using the treatment apparatus comprising two rotating devises, the microorganisms in the sawdust reproduce in such a great numbers under high temperature that they speed up the decomposition of the organic materials and thus treatment efficiency increased.

According to an aspect of the invention, by providing two rotating devises in the reactor basin so as to sufficiently mixing human waste and sawdust, the microorganisms under high temperature reproduce in such a great numbers that the treatment period for decomposing excrement is shortened and the efficiency for the composting is increased. Since this process for decomposing human waste is executed under high temperature, the pathogenic bacteria can be killed and offensive odor can be eliminated.

According to another aspect of the invention, since urine is guided to the location where the excrement is located, the offensive odor produced by the volatilization of the urine is decreased, making the bio-toilet of the invention more welcome by people.

According to another aspect of the invention, since the urine is guided directly to the location where the treated excrement is located, the organic components in the urine can speed up the decomposition of the excrement, and thus shorten the conversion period from human waste into organic fertilizer.

According to another aspect of the invention, since the bio-toilet of the invention is of a waterless type, a large quantity of water is saved and the problem associated with the pollution of environment caused by drainage of the sewage is eliminated, making the load applied to the environment decreased and the environmental protection most effective. Furthermore, treated by the treatment apparatus of the present invention, the microorganisms and the organic materials are combined and converted into stable loosen soil and the organic components such as nitrogen, phosphorus and potassium contained by it are combined with sawdust to produce loose and high quality organic fertilizer and soil reformer, making the soil improved, the natural materials recycled and pollution of the environment decreased.

BRIEF DESCRIPTION OF THE DRAWINGS

For a better understanding the preferred embodiments of the invention will be described with reference to the drawings, in which

FIG. 17A is a schematic view of the treatment apparatus shown in FIG. 7 with its end plates removed, showing a holder for electrical control means;

FIG. 17B is a perspective view of the holder;

DETAILED DESCRIPTION OF THE PREFERRED EMBODIMENTS

The invention uses the so-called composting, by which organic materials are decomposed and converted into $CO_2$, water, heat and organic fertilizer by microorganisms such as bacteria and actinomycete which exist everywhere in the nature.

Figure 1A:
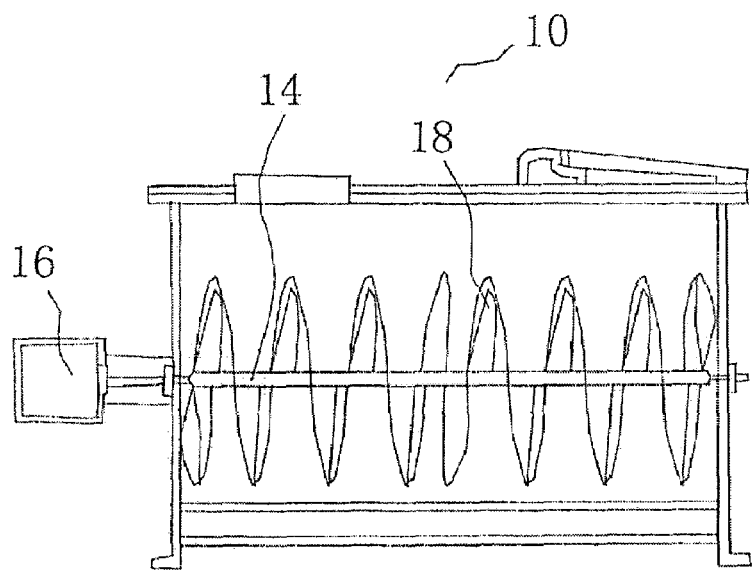
FIG. 1A-1C is a schematic view of the treatment apparatus of the prior art, showing the urinary inlet and the drop inlet.
Figure 1B:
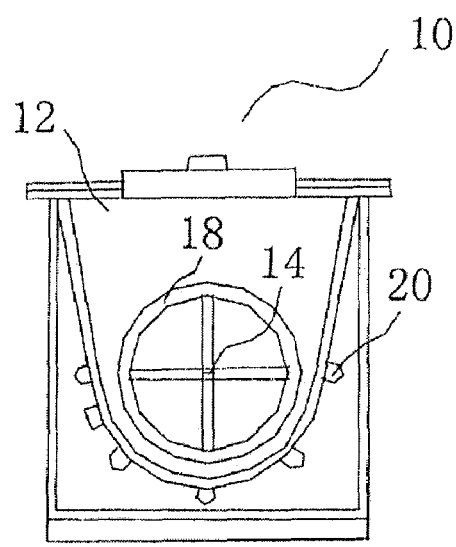
Figure 1C:
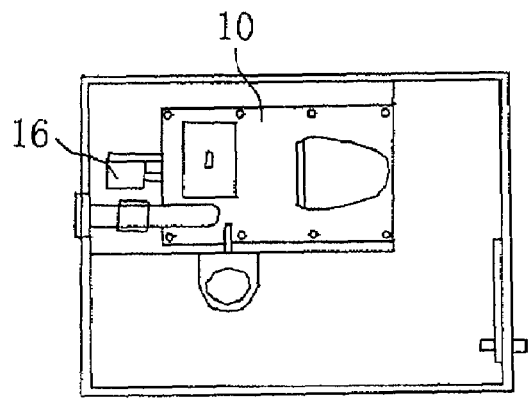
Figure 2:
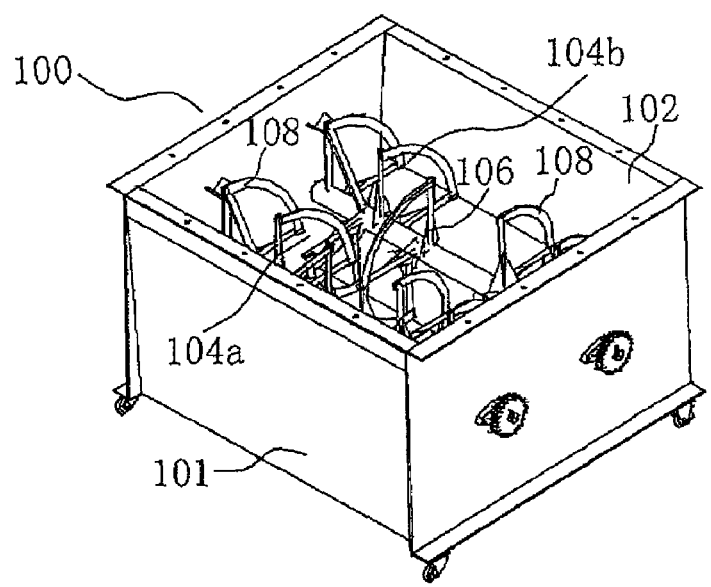
FIG. 2 is a perspective view of a treatment apparatus according to a preferred embodiment of the invention, showing two mixing devices parallel to each other in a reactor basin.
Figure 3:
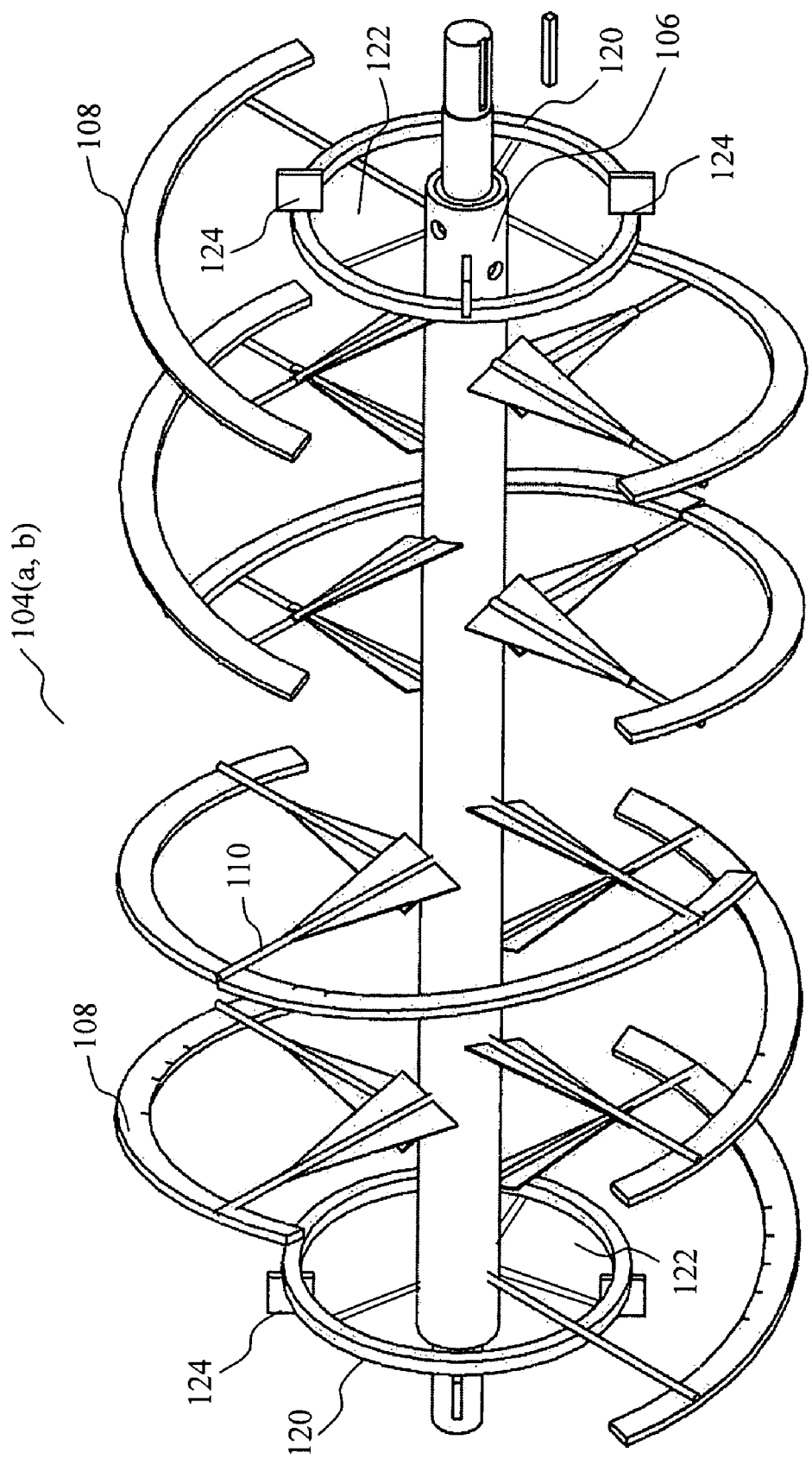
FIG. 3 is a perspective view of helical blade stirrer shown in FIG. 2, showing the helical is of discontinuous.

As shown in FIG. 2, a treatment apparatus for excrement 100 of the present invention has a tank 101, a reactor basin 102 provided in the tank for containing the sawdust and excrement and two mixing devices 104a and 104b which are provided in the reactor basin and overlapped partially in this embodiment. As shown in FIG. 3, each of two mixing devices 104(a, b) comprises a rotation shaft 106 and a helical blade stirrer 108 which is divided into two parts respectively located at each end of the rotation shaft 106. The helical of each stirrer 108 is of discontinuous and is secured to the rotation shaft 106 by spokes 110. Particularly, the projection for the helical of the present invention on a plane perpendicular to the rotation shaft 106 is a whole circle, ensuring that the sawdust is stirred uniformly.

Figure 4:
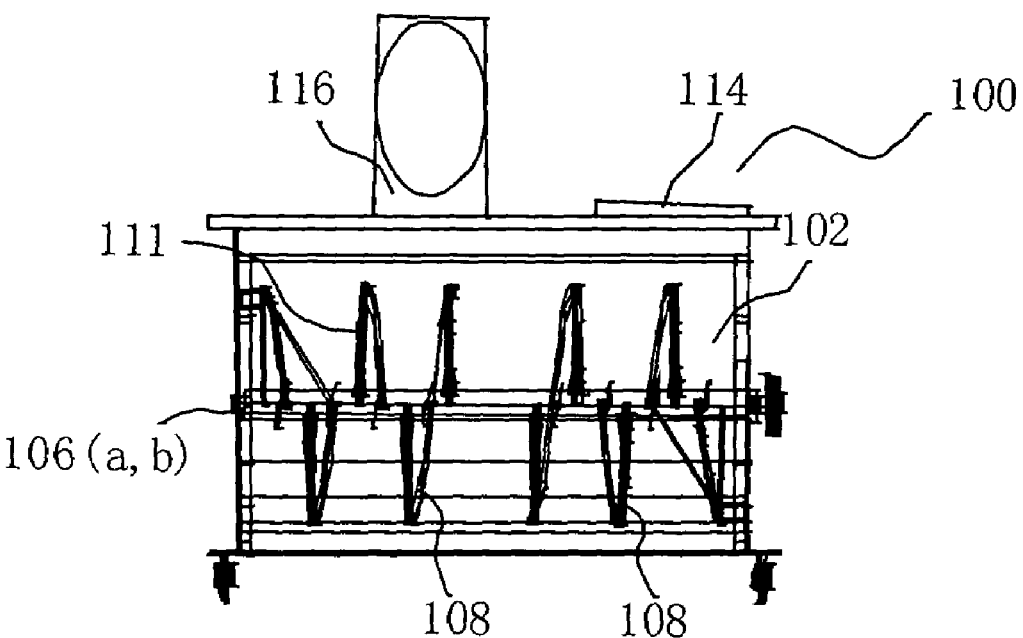
FIG. 4 is a schematic view of a toilet comprising the treatment apparatus shown in FIG. 2, showing helical blade stirrer is divided into two parts and the helical direction of two parts are disposed oppositely.

Referring to FIG. 4, the helical direction of each part of stirrer 108 is disposed oppositely, that is, if the helical of blade at one end of the shaft is right-hand, the helical of blade at other end of the shaft is left-hand, and vice versa. So the two parts of the helical blade stirrer 108 can convey the sawdust from each end of the reactor basin 102 to the central region as the mixing device 104 rotates.

Figure 5:
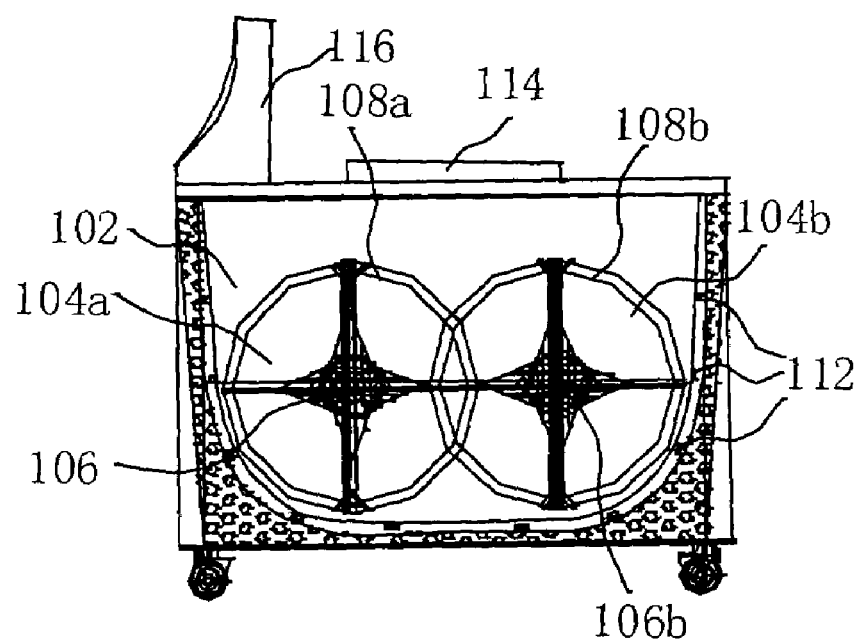
FIG. 5 is a schematic end view of the toilet shown in FIG. 4, showing the two mixing devices overlapping partially.

As shown in FIG. 5, the helical blade stirrer 108a and 108b of the mixing devices 104a and 104b are overlapped partially so as to decrease the dead area in which may form a hardened heap.

Since an appropriate temperature is necessary for decomposing the organic materials, a temperature control means 112 is provided on outer side surface of the basin for maintaining the temperature within the basin at a predetermined constant temperature. On the other hand, the predetermined temperature can refrain the microorganisms in the excrement from growing and eliminate offensive odor, making the bio-toilet more welcome by people. According to the present invention, the basin 102 has a drop inlet 114 and a urinary inlet 116, by which the excrement can drop directly down into the basin and mix with the sawdust. According to the embodiments of the present invention, with respect to the same volume of the reactor basin, the height of the tank can be decreased due to the increased width of the basin.

Referring to FIG. 5, to make the treatment apparatus of the invention more compact, the two mixing devices 104a and 104b are parallel to each other, that is, the rotation shafts 106a and 106b have the same height and extend through the whole length of the basin. Furthermore, the helical blade stirrer 108a, 108b of the two mixing devices 104a and 104b are evenly staggered along the shaft 106 and are overlapped partially so as to sufficiently mix and stir sawdust.

Furthermore, the helical blade stirrer 108 (*a, b*) can convey the sawdust towards the central region of the basin 102 with rotation of the shaft 106. Thus, the excrement could be carried away from the drop inlet 114 to ensure the uniformity for the mixture of sawdust and excrement. In this way, it is conceivable that the sawdust outside the areas where can be reached by the stirrer 108 will be piled up, so much as hardened, due to stillness of the sawdust for some times. Returning back to FIG. 3, the present invention not only defines the helical direction for two parts of stirrer 108 to be opposed with each other, but defines two pulvimixing rings 120 as well at outer side of the two parts of each stirrer 108, which is also secured to the shaft by spokes 122. Specially, a plurality of blocks for loosing 124 are spaced around the circumference of each ring 120 for stirring and loosing the sawdust. According to the preferred embodiment, the mixture of sawdust and excrement can be preferably piled up at the center region of the basin 102 and thus has to spread from this central region to all directions with the rotation of shaft 106. In addition, the drop inlet 114 of the present invention should be provided adjacent to one end of the mixing devices 104*a* and 104*b* and substantially aligned to the mixing devices 104*a* and 104*b* vertically to prevent the heap of compost in the central region of the basin from influencing the usage of the bio-toilet.

Figure 6:
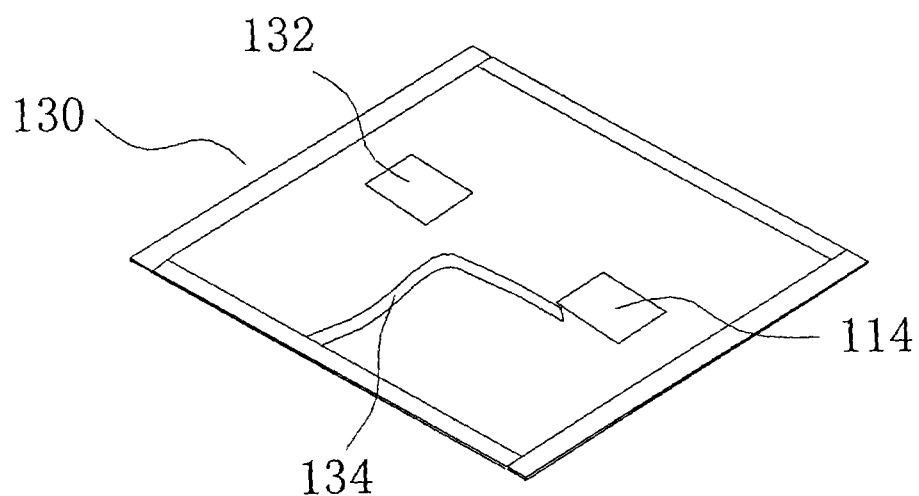
FIG. 6 is a perspective view of a top plate of the treatment apparatus according to a preferred embodiment of the invention, showing that a conduit provided at an inner side thereof is communicated with a urinary inlet.

Preferably, the top plate 130 of the present invention comprises an opening 132 for feeding sawdust and removing the converted fertilizer and a conduit 134 at the inner side of the top plate 130, as shown in FIG. 6. The inlet of the conduit 134 is connected with the urinary inlet 116 and the outlet of the conduit 134 extends towards the central region of the basin 102 or adjacent to the drop inlet 114 for guiding urine so as to have the urine and excrement mixed sufficiently.

Figure 7:
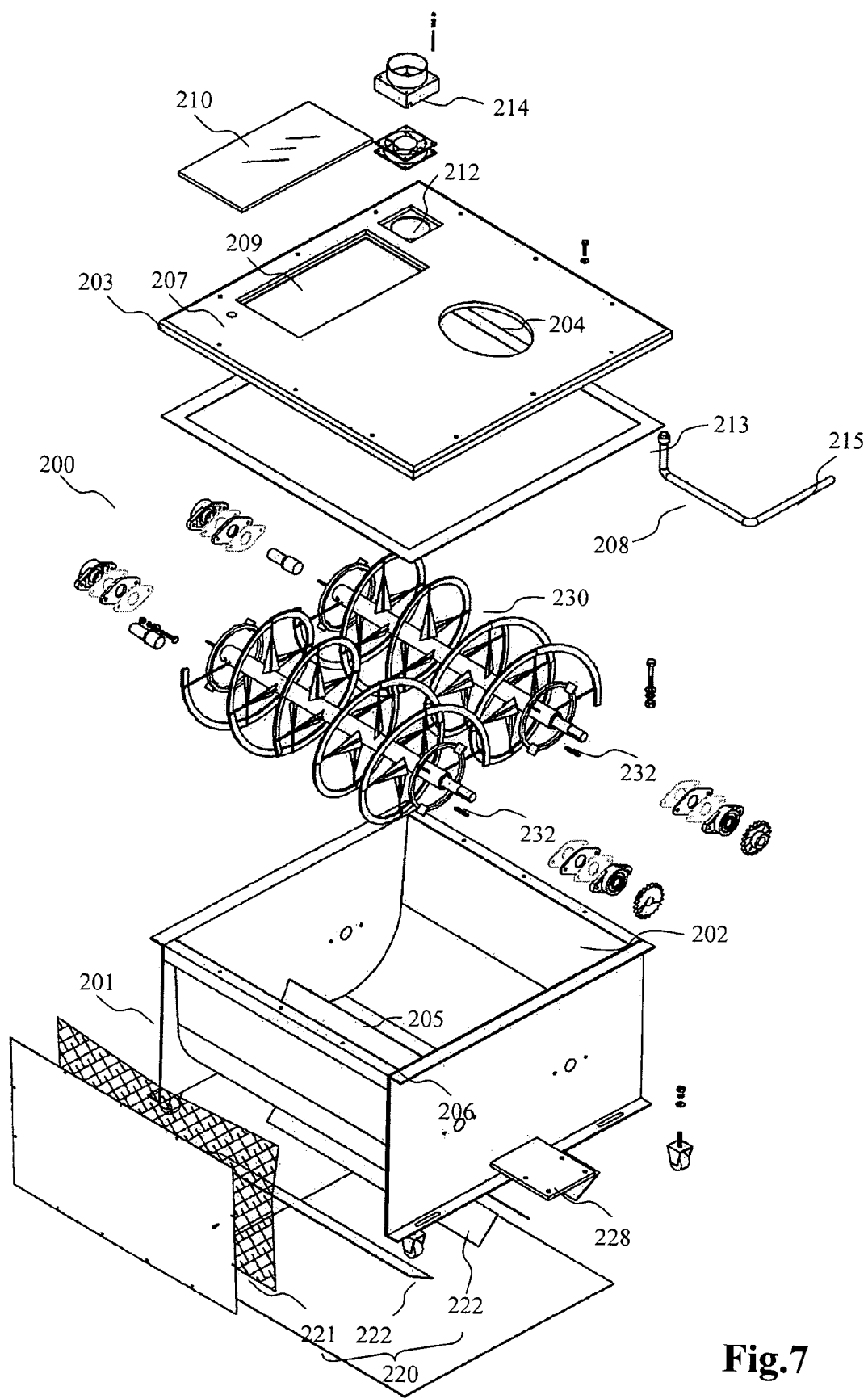
FIG. 7 is an explosive perspective view of a toilet according to another preferred embodiment of the invention.

FIG. 7 is an explosive perspective view of a toilet according to another preferred embodiment of the invention. The treatment apparatus 200 has a tank 201, a reactor basin 202 in the tank for containing the sawdust and human waste and two mixing devices 230 provided in the reactor basin. A temperature control means 220 is provided on an outer surface of the basin 202 for maintaining the temperature within the basin at a predetermined range. The top plate 203 of the tank 201 comprises at least one drop inlet 204 which is substantially aligned to one end of mixing devices 230 vertically.

Figure 8:
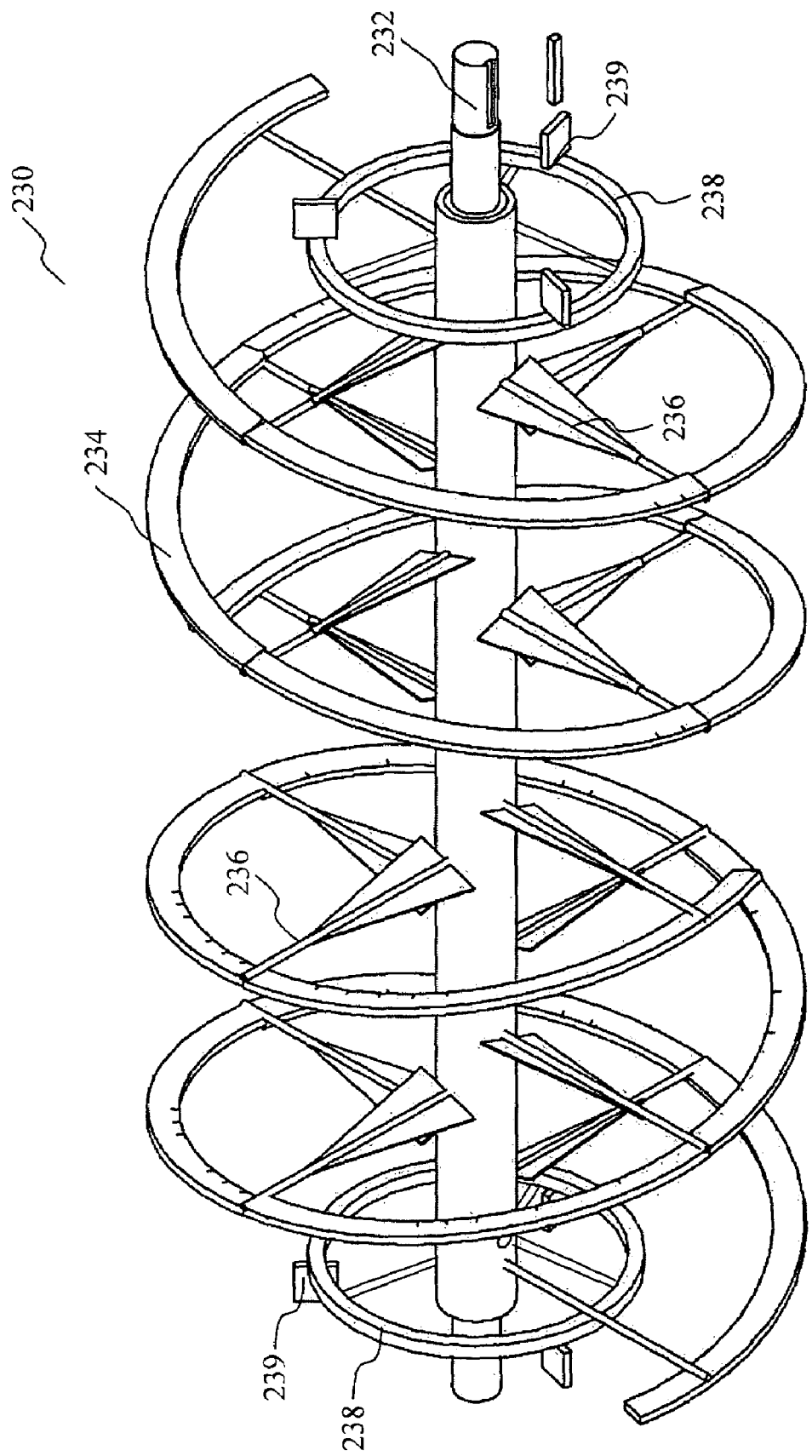
FIG. 8 is a perspective view of helical blade stirrer shown in FIG. 7.
Figure 9:
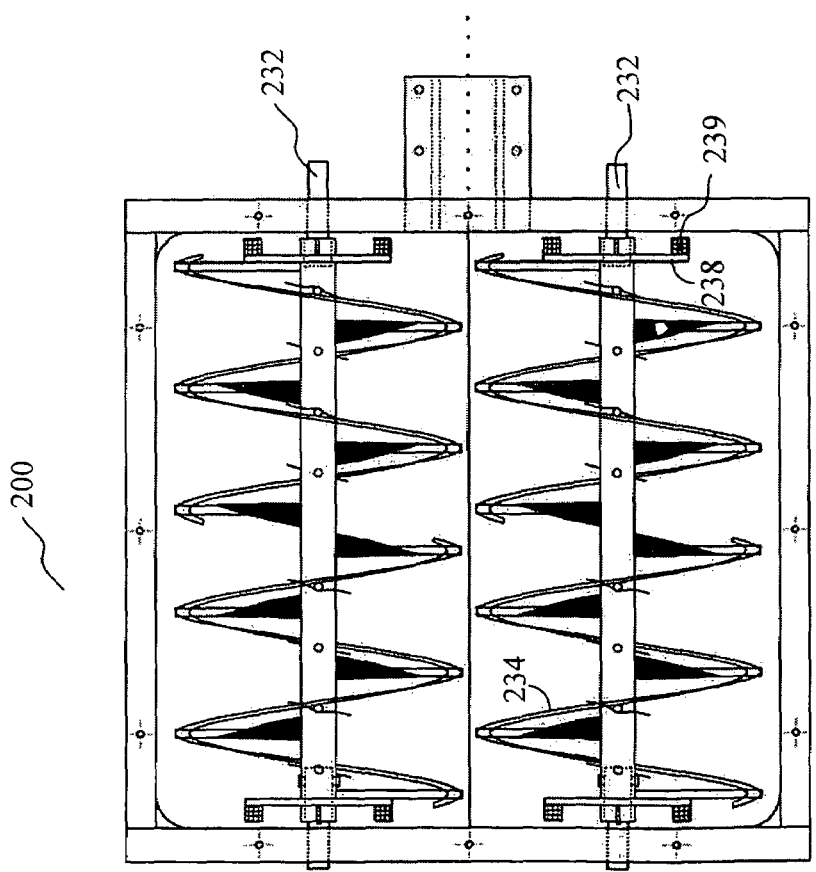
FIG. 9 is a top view of the treatment apparatus shown in FIG. 7, showing the helical blade stirrer is divided into two parts, of which helical direction is disposed oppositely.

Likewise, each of two mixing devices 203 comprises, as shown in FIG. 8, the helical blade stirrer 234 of each mixing device 230 is divided into two parts which are respectively arranged at ends of the rotating shaft 232. Also, the helical direction of the stirrer 234 is disposed oppositely. Then, two pulvimixing rings 238 is provided at the outer side of the stirrer 234 by the spokes, on which a plurality of blocks for loosing 239 is provided. Dissimilarly to the above embodiment, the helical of the stirrer 234 is of continuous, as the stirrer 234 of two mixing devices 230 are spaced apart instead of overlapping partially, as shown in FIG. 9.

Figure 10:
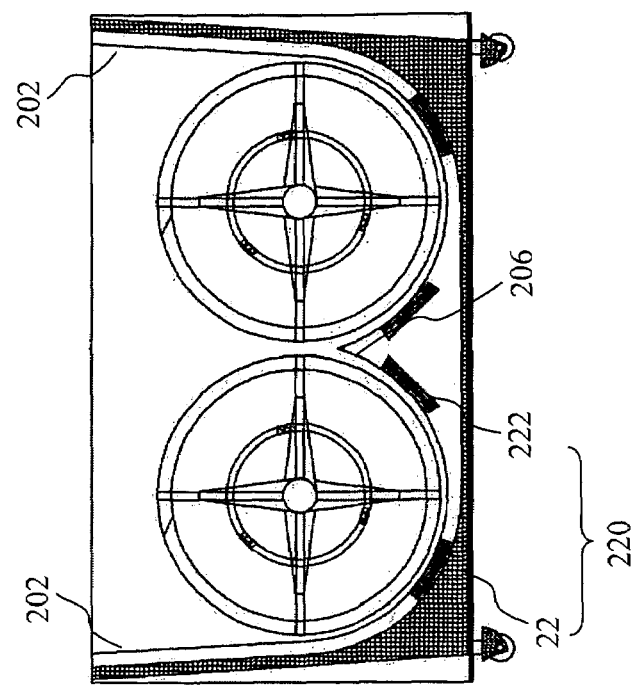
FIG. 10 is an end view of the treatment apparatus shown in FIG. 7, showing the two mixing devices spaced apart.

Specially, the reactor basin 202 also comprises two concave parts 205 having a curved profile. Referring now to FIG. 10, in order to match with the stirrer 234 of the mixing device 230, the space between the curves of the concave parts 205 and the stirrer 234 is of same substantively, for example, the space of the preferred embodiment is about 0.5 cm-2 cm.

Figure 11:
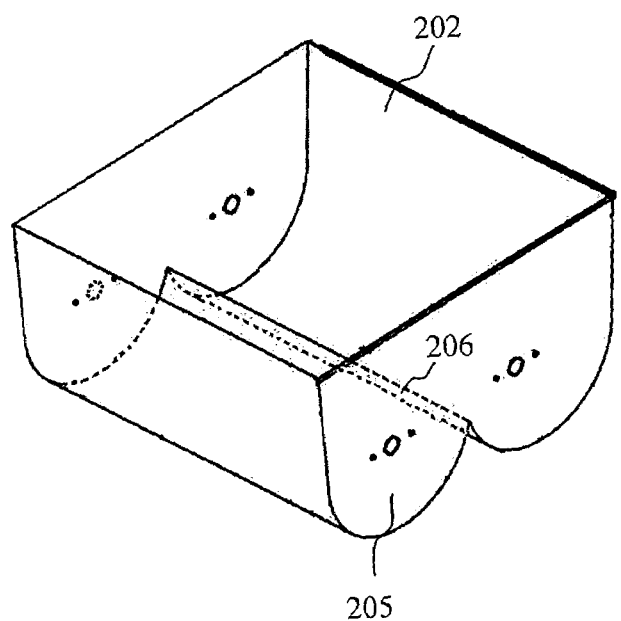
FIG. 11 is a schematic view of the reactor basin.

There is a transition part between the two concave parts 204 at the bottom of the basin 202, the height of which should be certainly lower than that of the shaft 232. For example, if the curves of the two concave parts do not overlap, the transition part will be a flat (not shown ). According to the preferred embodiment, the transition part is defined to be a protuberant intersection 206, by referring to FIG. 11. The triangular-shaped area between the two mixing devices are commonly called dead area, in which the sawdust may pile up to form a hardened heap. Hence, the treatment apparatus of the present invention effectively prevents the sawdust from piling up and avoids a hardened trouble by defining the two concave parts 205.

Figure 12:
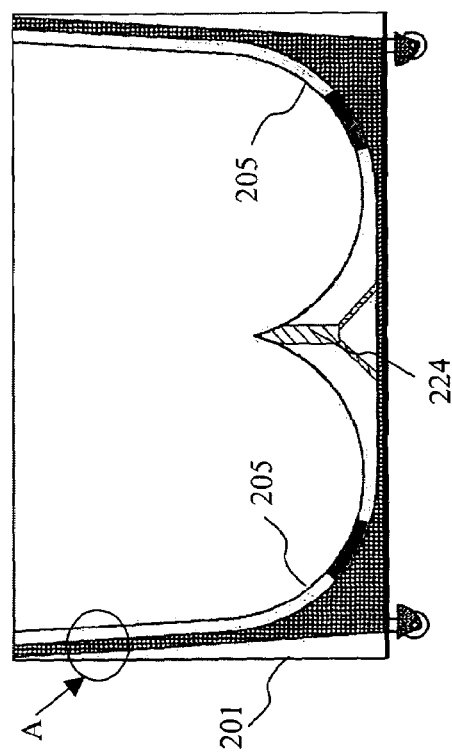
FIG. 12 shows a support on the bottom plate.

Furthermore, according to the present invention, a support 224 is preferably provided on the bottom of the tank 201 between the two concave parts 205 to strengthen the bottom of tank 201, as shown in FIG. 12.

Figure 13:
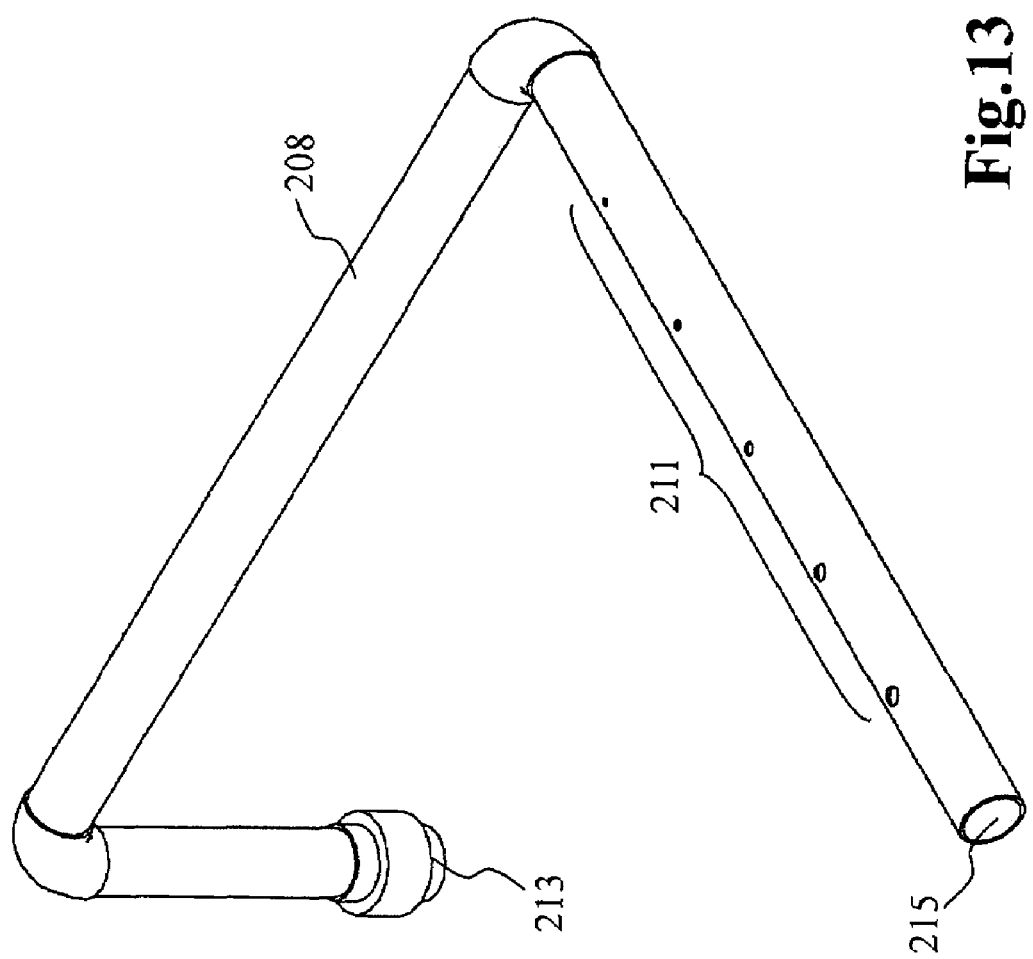
FIG. 13 is a perspective bottom view of a conduit according to the present invention, showing a plurality of dispensing holes.

Referring back to FIG. 7, the top plate of the tank 201 comprises an opening 209 for feeding the sawdust and removing the converted organic fertilizer, which is covered by a cover 210 when not in use. An air outlet 212 for realizing vacuum within the tank to improve the ventilation and an urine inlet 207 are spaced apart from the drop inlet 204 by a predetermined distance. Of course, the treatment apparatus 200 of the invention should also comprise a conduit 208 located at the top plate of the tank 201, the shape and length of which depend on the locations of the urinary inlet 207 and the drop inlet 204, as the inlet 213 of which is communicated with the urinary inlet 207 and the outlet 215 of which is adjacent to the drop inlet 204 or central region of the basin 202. Preferably, a plurality of dispensing holes 211 are provided at the bottom of the conduit 208 to uniformly dispense urine into the basin 202, as shown in FIG. 13, the diameter of the holes 211 increases gradually as they approach the outlet 215.

Likewise, a temperature control means is also needed and is provided with a plurality of heating plates 222 on the outer side of the basin, as shown in FIG. 10, temperature sensors (not shown) in accordance with the present invention may be certainly provided on the heating plates so as to turn on and off the heating plates to maintain the temperature, for example in the range of 50° C.-70° C.; and a insulation layer 221 on the outer side of the heating plates which may fill the whole space between the reactor basin 202 and the tank 210 so as to increase the effect of insulation. Of course, the temperature control means 220 can be also provided within the basin in accordance with the actual application.

Figure 15:
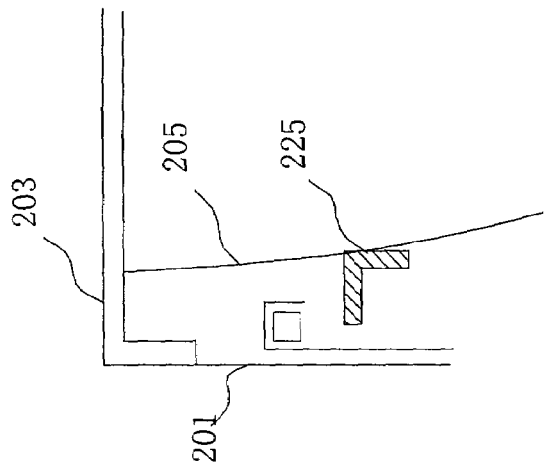
FIG. 15 is enlarged views for schematically showing juncture between the side plate and the top plate, showing a insulation element provided at the juncture.
Figure 14:
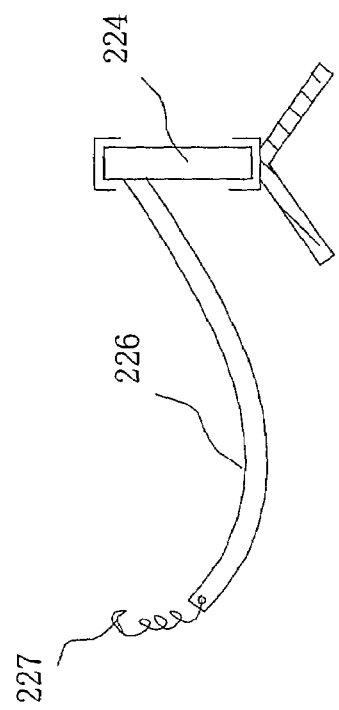
FIG. 14 is a schematic view of a holder for a temperature control means.

Preferably, the temperature control means also comprises a holder 226 for maintaining the insulation layer 221. Preferably, the holder 226 may be at least a bending plate which matches with the curve of the concave parts 205, as shown in FIG. 14, or elastic plate so as to surround the reaction basin 202, wherein one end of the holder 226 is secured to the support 224 on the bottom of tank 201 and the other end is secured to the tank 201 by a spring hook 227. In addition, the top plate 203 is connected to the side plate of the tank 201 in removable manner to be convenient for installation, for example, snap fitting. Of course, a heat-insulating element at the juncture between the top plate and the side plate is needed for preventing the heat within the basin 202 from discharging out of the tank 201, referring to FIG. 15.

Figure 16:
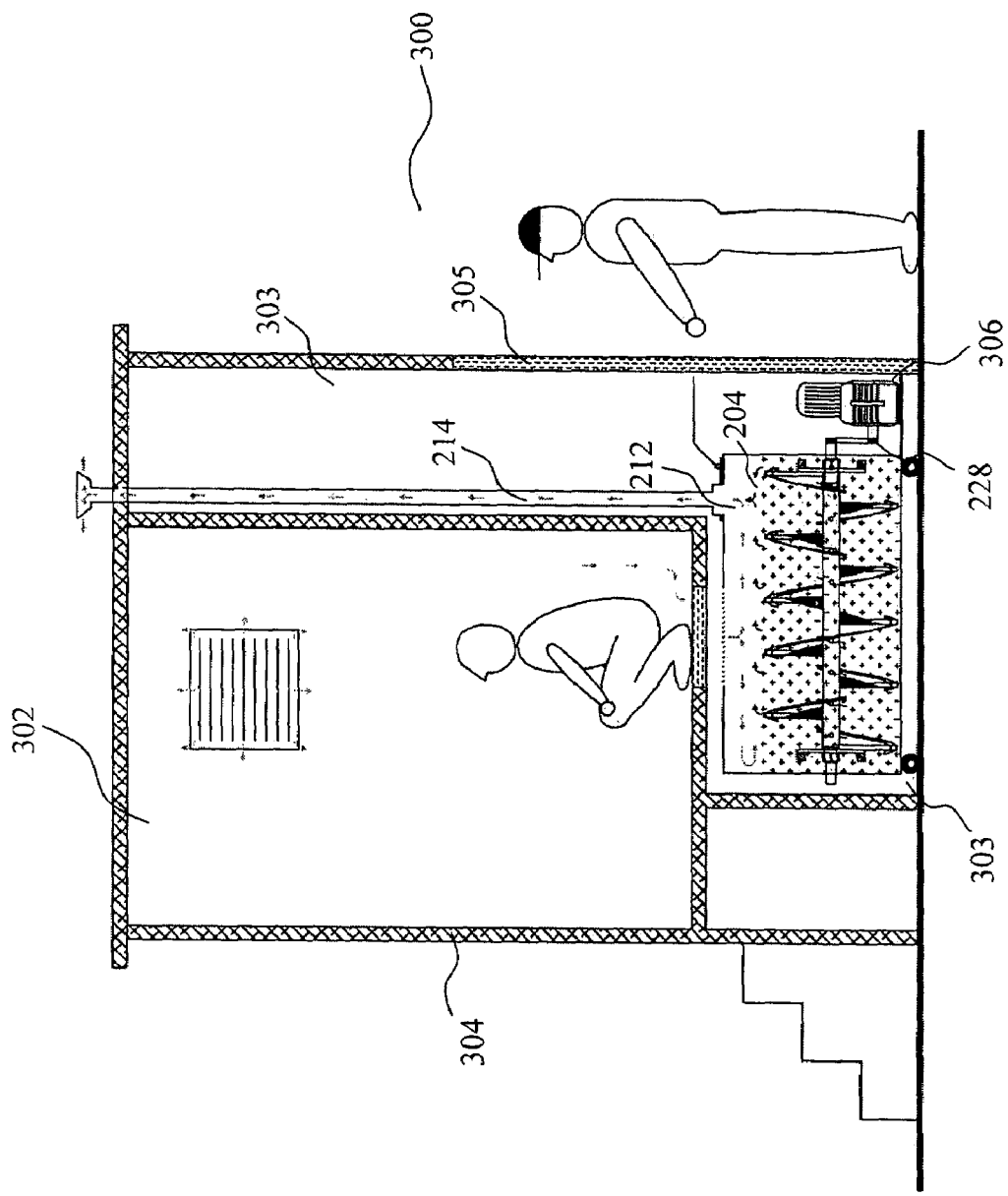
FIG. 16 schematically shows the structure of the bio-toilet of the invention.

The bio-toilet of the present invention can be easily constructed by using the above treatment apparatus of the invention, which the appearances likes a house. Generally, the floor should be provided in the house for dividing the space into two parts—usage part above the floor and the operation part under the floor. As shown in FIG. 16, the inside space of the house is divided into a inner room 302 with door 304 and an operation room 303 with a door 305. The treatment apparatus 100/200 of the present invention is provided under the floor of the inner room 302. The treatment apparatus 200 is herewith set forth by reference. Thus, an air vent tube in communication with the air outlet 212 on the top plate of the treatment apparatus 200 extends from the operation room 303 to the outside of the house. Preferably, a exhaust fan (FIG. 7) is integrally connected with the air outlet 212 on the top plate for easy maintenances.

Also, the rotation shafts of the mixing devices are driven by a driving device 306. In the preferred embodiment, the driving device 306 is provided on the side plate of the tank 201 by a support 228 (FIG. 7). Furthermore, as shown in FIGS. 17A and 17B, a holder 229 for holding a control unit (not shown) is provided at a side plate of the tank 201.

In general, under the best controlled state, the organic materials subjects to three stages of reaction, controlled by different microorganisms, that is, there are mesophilic stage, thermophil stage and maturation stage. The initial decomposition is achieved by mesophilic microorganisms which decompose quickly the soluble and degradable mixture and heat produced thus causes the temperature rising quickly. As the temperature is over 40° C., the next process is controlled by thermophilic microorganisms in stead of mesophilic microorganisms. As the temperature rises to 50° C. or above, the microorganisms in the human body or plant are killed. Since when the temperature is over 65° C., a large quantity of microorganisms are killed and the decomposing rate is decreased, the temperature must be maintained at a level lower than 65° C. by means of good ventilation and sufficient mixing of the excrement and sawdust. In the thermophil stage, the high temperature can speed up the decomposition of the mixture of protein, fat, cellulose and hemicellulose and main molecules in plant. As the energy of the thermophilic microorganisms exhausts, the temperature of the compost decreases and the last stage—the maturation stage is controlled again by the mesophilic microorganisms. Hence, the treatment apparatus of the invention meets the above decomposition requirements by providing the temperature control means, ventilation means and setting up the period of rotation for mixing devices.

Figure 18:
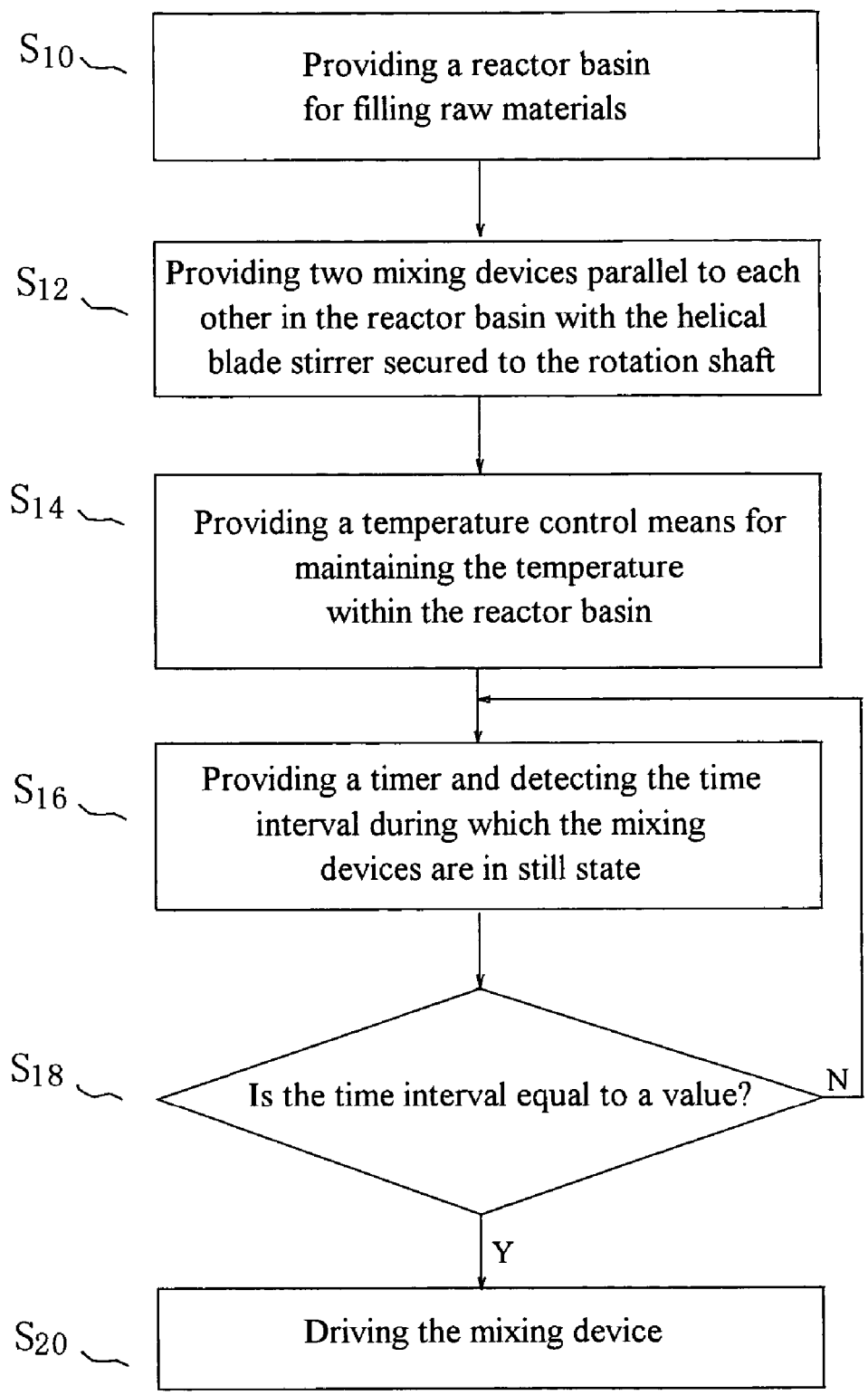
FIG. 18 is a flowchart describing the treatment process for discomposing the human waste.

With reference to the flowchart in FIG. 18, the treatment method of the invention comprising the following steps. Firstly, at step S10, a reactor basin for filling raw materials is provided. Next, at step S12, two mixing devices parallel to each other is provided within the basin, each of which includes a rotation shaft and two helical blade stirrer secured to the rotation shaft. Preferably, the helical direction for two part of the stirrer must be disposed oppositely. At step S14, a temperature control means is provided for maintaining the temperature within the basin at a predetermined range for decomposing the human waste. In step S16, a timer is specially provided for detecting a time interval during which the mixing devices are in still state. Then, there is a step 18 of determining whether the time interval is detected to be equal to a value? If the determination is YES, the mixing devices are driven by a control means to stir the raw material and excrement at step 20; if the determination is NO, process goes to the step 16 for detecting the time interval continuously.

The purpose of driving the mixing devices is to stir the raw material and the excrement, that is, to cover up the new excrement with sawdust. Hence, the rotation devices rotate an appropriate angle every time and when the rotation devices complete one turn of rotation, the mixing devices rotate in reverse direction under the control of the control unit.

Figure 19:
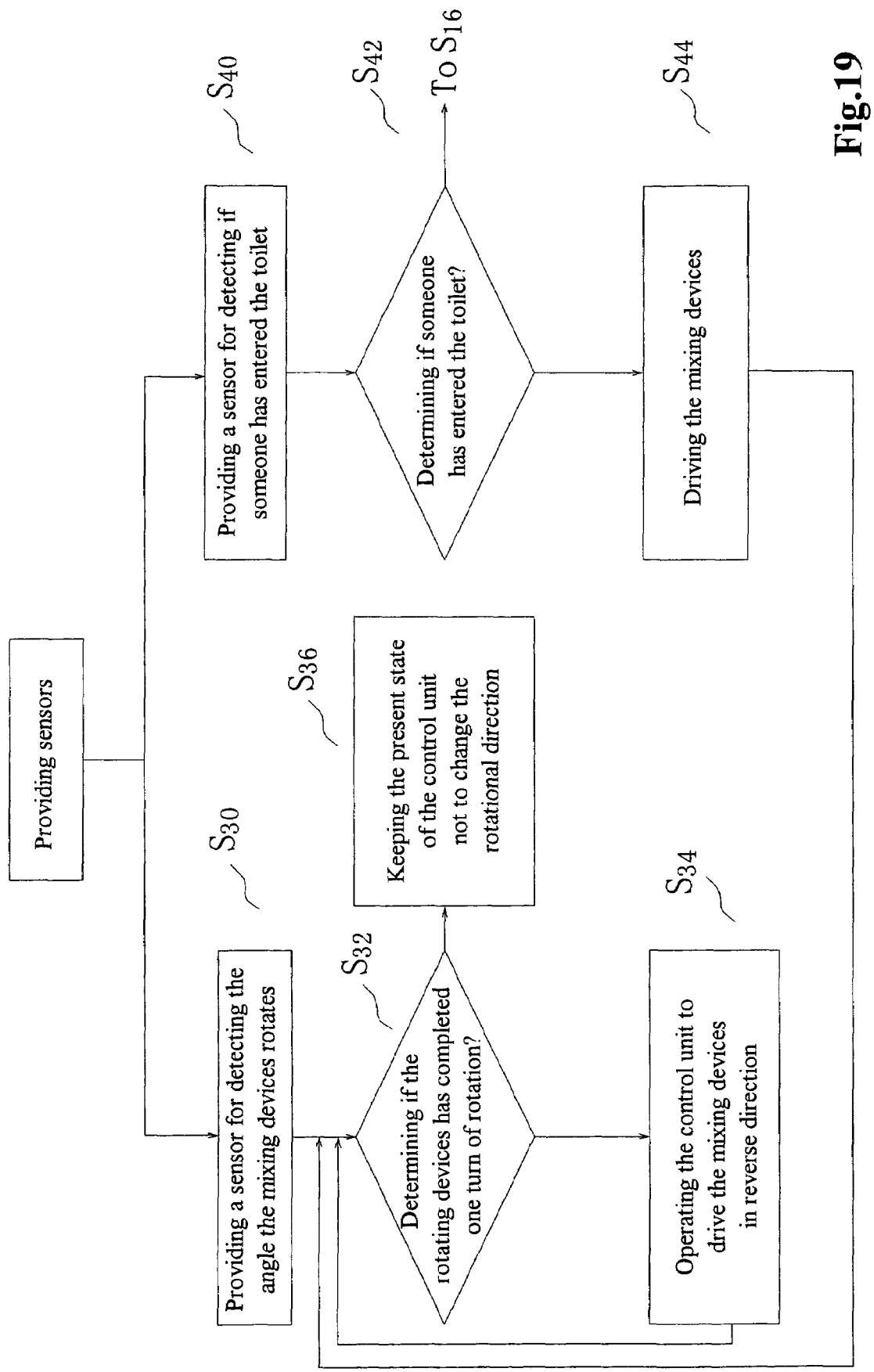
FIG. 19 is a flowchart describing the operation of the helical blade stirrer of the invention.

With reference to the flowchart in FIG. 19, the treatment method according to the invention also includes a step of providing a sensor. That is, in Step 30, providing a sensor for detecting the rotation angle while being driven. Next, determining if the mixing devices has completed one turn of rotation? If the determination is YES, the process goes to the step S34 for operating the control unit to drive the mixing devices in reverse direction. And if the determination is NOT, the process goes to the step S36 for keeping the present state of the control unit so as not to change the rotational direction of the mixing devices. Then, the process returns back to Step S32. Preferably, at step S40, the invention provides a sensor at the drop inlet or the door of the inner room for detecting if someone has entered the bio-toilet. Next, at step 40, determining if someone has entered the toilet. If the determination is YES, the control unit outputs a single to drive the mixing device and repeats step S32; if the determination is NOT, process goes to step S16 as shown in FIG. 18.

It is obvious that the present invention can also provide a timer for detecting a time interval to be last by user. If the timer interval from the bio-toilet being used is equal to a predetermined value, such as 15 minutes, driving the mixing devices. Certainly, the step of driving the mixing devices when a user going out can be included in accordance with the present invention.

According to the above treatment method, the mixing devices complete one turn of rotating when it is driven several times. Furthermore, the temperature within the tank is easily maintained at a range of 50-70° C. by using a temperature control means. With the above treatment apparatus and method, the time period for decomposing the excrement is about 10 hours, the bacteria can be killed from several minutes to 60 minutes under high temperature and the time for producing the organic fertilizer through fermentation is about two days and no offensive odor occurs during the whole decomposition and fermentation process. Therefore, the bio-toilet of the invention can be widely used at scenic places, temporary meeting places, construction sites, railway stations and parks, etc.

It will be apparent to those skilled in the art that various modifications and variations can be made in the bio-toilet and the treatment method of decomposing excrement of the present invention without departing from the spirit or scope of the invention. Thus, it is intended that the present invention cover the modifications and variations of this invention provided they come within the scope of the appended claims and their equivalents.

The invention claimed is:

1. A treatment apparatus for excrement comprising a reactor basin for containing sawdust and excrement, provided with at least two concave parts having curved profile on the bottom;

a temperature control means for maintaining the temperature within said reactor basin at a predetermined range, and at least two mixing devices for mixing the sawdust and excrement, matched with each concave parts and spaced apart from each other, each of which respectively has a rotation shaft, and a helical blade stirrer, provided on said rotation shaft by a plurality of spokes and divided into two parts, helical directions of which are reverse, wherein said helical blade stirrers of the mixing devices are overlapped partially; and wherein pluvimixing rings are respectively provided at outer sides of each helical blade stirrer, on which a plurality of blocks for loosing are provided.

2. The treatment apparatus for excrement of claim 1, wherein a protuberant intersection is formed at a height which is lower than that of the rotation shaft after said two concave parts in the bottom of said basin are connected.

3. The treatment apparatus for excrement of claim 2, wherein the curves of the concave parts are substantively spaced evenly with said mixing device.

4. The treatment apparatus of claim 1, wherein a top plate is provided to cover said reactor basin, having
- a drop inlet;
- a urinary inlet, spaced apart from the drop inlet, and
- a conduit, arranged at an underside of the top plate, an inlet of which is communicated with said urinary inlet and the outlet of which is adjacent to said drop inlet so as to guide urine to the place where excrement drops.

5. A bio-toilet, being divided into two spaces by a floor, wherein the space under the floor is provided with
- a tank, the top plate of which having a drop inlet and a urinary inlet, spaced apart from the drop inlet;
- a reactor basin for containing sawdust and excrement, provided with at least two concave parts having curved profile on the bottom;
- a temperature control means for maintaining the temperature within said reactor basin at a predetermined range, provided with
- a heating plate, disposed on the outer surface of the reaction basin, and
- a insulation layer, covered the heating plate;
- at least two mixing devices for mixing the sawdust and excrement, matched with each concave parts, and spaced apart each other, each of which respectively has
- a rotation shaft, and
- a helical blade stirrer, provided on said rotation shaft by a plurality of spokes and divided into two parts, helical directions of which are reverse, wherein said helical blade stirrers of the mixing devices are overlapped partially;
- a driving means provided outside the tank for driving the two mixing devices; and
- a control unit;
- wherein pluvimixing rings are respectively provided at outer sides of each helical blade stirrer, on which a plurality of blocks for loosing are provided.

6. The bio-toilet of claim 5, wherein a protuberant intersection is formed at a height which is lower than that of the rotation shaft after said two concave parts in the bottom are connected.

7. The bio-toilet of claim 6, wherein, wherein the curves of the concave parts are substantively spaced evenly with said mixing device.

8. The bio-toilet of claim 7, wherein, wherein the distance between the mixing device and the concave parts is about 1 cm-3 cm.

9. The bio-toilet of claim 8, wherein a support is provided on the bottom plate of the tank between the two concave parts for supporting the protuberant intersection.

10. The bio-toilet of claim 9, wherein the temperature control means further includes a holder for holding the insulation layer, one end of which is secured to the support and the other end is secured to the tank by a spring hook.

11. The bio-toilet of claim 5, wherein a conduit is arranged at an underside of the top plate, an inlet of which is communicated with said urinary inlet and an outlet of which is adjacent to said drop inlet so as to guide human urine to the place where excrement drops.

12. The bio-toilet of claim 11, wherein a plurality of dispensing holes is provided at the bottom of the conduit.

13. The bio-toilet of claim 12, wherein the diameter of the dispensing holes increases gradually as they approach the outlet.

14. The bio-toilet of claim 5, wherein the top plate of the tank is assembled with the side plate of the tank in a removable manner with a heat-insulating element at the juncture between the top plate and the side plate.

15. A method for decomposing excrement by using the bio-toilet of claim 5, comprising the steps of:
- providing said reactor basin for containing sawdust and excrement, provided with said at least two concave parts;
- providing said temperature control means for maintaining the temperature within the reactor basin at a predetermined range; and
- providing said at least two mixing devices for mixing the raw material and excrement, matched with each concave part, and spaced apart from each other, each of which respectively has
- a rotation shaft, and
- a helical blade stiffer, provided on said rotation shaft by a plurality of spokes and divided into two pads, helical directions of which are reverse, wherein said helical blade stirrers of the mixing devices are overlapped partially and wherein pluvimixing rings are respectively provided at outer sides of each helical blade stirrer, on which a plurality of blocks for loosing are provided.

16. The method of claim 15, wherein the step of driving the mixing devices comprises driving the mixing devices in a reverse direction when the mixing devices complete one turn of rotation so as to sufficiently stir the excrement.

17. The method of claim 16, wherein one turn of rotation for the mixing devices is completed by driving the mixing devices several times.

18. The method of claim 17, further comprising the step of driving the mixing devices somebody enters the bio-toilet.

19. The method of claim 18, further comprising the step of driving the mixing devices after the usage for the treatment apparatus is completed.

* * * * *